United States Patent
Konno (10) Patent No.: US 7,279,807 B2
(45) Date of Patent: Oct. 9, 2007

(54) VEHICLE ELECTRONIC KEY SYSTEM

(75) Inventor: Takeshi Konno, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/529,292

(22) PCT Filed: Sep. 25, 2003

(86) PCT No.: PCT/JP03/12272

§ 371 (c)(1),
(2), (4) Date: Mar. 25, 2005

(87) PCT Pub. No.: WO2004/028873

PCT Pub. Date: Apr. 8, 2004

(65) Prior Publication Data

US 2005/0253461 A1    Nov. 17, 2005

(30) Foreign Application Priority Data

Sep. 27, 2002  (JP)  .............................. 2002-282305

(51) Int. Cl.
*B60R 25/04* (2006.01)
*H01H 47/00* (2006.01)
(52) U.S. Cl. .................................... 307/10.5
(58) Field of Classification Search ................ 307/105, 307/10.5
See application file for complete search history.

(56) References Cited

U.S. PATENT DOCUMENTS

| 4,688,036 | A | 8/1987 | Hirano et al. |
| 5,157,389 | A | 10/1992 | Kurozu et al. |
| 5,293,160 | A | 3/1994 | Kurozu et al. ......... 340/825.32 |
| 5,343,077 | A | 8/1994 | Yoshida et al. ............... 307/9.1 |
| 5,689,142 | A | 11/1997 | Liu |
| 5,939,975 | A | 8/1999 | Tsuria et al. |

(Continued)

FOREIGN PATENT DOCUMENTS

DE            10034348            1/2002

(Continued)

*Primary Examiner*—Michael Sherry
*Assistant Examiner*—Carlos Amaya
(74) *Attorney, Agent, or Firm*—Carrier, Blackman and Associates, P.C.; Joseph P. Carrier; William D. Blackman (57) ABSTRACT

A control device includes a transmitter for outputting a request signal to an electronic key in response to the ON operation of a predetermined switch (start switch) among a plurality of switches (winker switch, horn switch, etc.) arranged in the vicinity of a user who has sat on the driver seat of the vehicle (request signal) generator, a transmission circuit, and a transmission antenna, a detector for detecting a response signal from the electronic key (a reception circuit and response signal matching device), and monitor for outputting a lock release instruction to an actuator when the response signal shows that the request is from a regular or proper user.

2 Claims, 11 Drawing Sheets

U.S. PATENT DOCUMENTS

| | | |
|---|---|---|
| 6,057,657 A | 5/2000 | Kitamura |
| 6,188,141 B1 | 2/2001 | Daviaud .................... 307/10.5 |
| 6,194,997 B1 * | 2/2001 | Buchner et al. ....... 340/426.26 |
| 6,236,850 B1 * | 5/2001 | Desai ...................... 455/343.2 |
| 6,386,447 B1 | 5/2002 | Proefke et al. ............. 235/380 |
| 6,621,406 B2 | 9/2003 | Kumano .................... 340/5.62 |
| 6,798,337 B2 | 9/2004 | Onuma et al. |
| 6,944,528 B2 | 9/2005 | Nagano ........................ 701/49 |
| 6,946,949 B2 | 9/2005 | Heide et al. ............... 340/5.61 |
| 2004/0217846 A1 | 11/2004 | Konno et al. |

FOREIGN PATENT DOCUMENTS

| | | |
|---|---|---|
| EP | 0860353 | 8/1998 |
| EP | 1 211 170 | 6/2002 |
| EP | 1445180 | 8/2004 |
| FR | 2751293 | 1/1998 |
| JP | 60-117824 | 6/1985 |
| JP | 03-021575 | 1/1991 |
| JP | 03-217660 | 9/1991 |
| JP | 03-295777 | 12/1991 |
| JP | 04-011587 | 1/1992 |
| JP | 04-038246 | 2/1992 |
| JP | 10-317754 | 12/1998 |
| JP | 2000-103316 | 4/2000 |
| JP | 2000-104429 | 4/2000 |
| JP | 2001-012123 | 1/2001 |
| JP | 2001-278156 | 10/2001 |
| JP | 2001-349110 | 12/2001 |
| JP | 2002-201838 | 7/2002 |
| WO | WO 02/29734 | 4/2002 |

* cited by examiner

FIG. 8A ACTIVATION SW
FIG. 8B MAIN SW
FIG. 8C Sr
FIG. 8D Sa
FIG. 8E Act

VEHICLE ELECTRONIC KEY SYSTEM

TECHNICAL FIELD

The present invention relates to an electronic key system for carrying out wireless communication between a transceiver or transmitter (electronic key) carried by a user and a controller mounted on the vehicle, and, when an ID is compared and there is a request from the normal user, starting the engine etc., the invention being suitable for use as, for example, an electronic key system for a vehicle such as a motorcycle.

BACKGROUND ART

Japanese Laid-Open Patent Publication No. 2001-349110 and Japanese Laid-Open Patent Publication No. 2001-349117 exist as disclosing known electronic key systems for a vehicle. The electronic key systems for a vehicle disclosed in these documents have activation means (switches) arranged in a door handle and trunk lid of the vehicle. If a user operates (activates) these activation means, communication with the electronic key commences, and a comparison is carried out between an ID transmitted from the electronic key and an ID registered in the controller. When the comparison shows that the respective ID's are matched, the door lock is released.

An electronic key system that has a transmission antenna provided for each door of a four-wheeled vehicle, which can release only the door that a portable device is closest to independently of the other doors of the vehicle, has also been proposed as related art (see, for example, Japanese Laid-Open Patent Publication No. 10-317754).

When applying this type of electronic key system to a motorcycle, it is necessary to provide some type of activation means equivalent to the activation means (switches) arranged in the door handle of the four-wheeled vehicle. In addition, when activation operations and the deposit and removal of a helmet from the motorcycle storage container by the user are taken into consideration, it is preferable to provide the activation means at positions that are within the natural reach of the user during these operations, such as on the handlebar or the seat.

The present invention has been conceived in view of this type of problem, and an object of the invention is to provide an electronic key system for a vehicle that can smoothly activate a controller during a series of operations by the user when boarding the vehicle, and which can improve operability of activation using the electronic key.

Another object of the present invention is to provide an electronic key system for a vehicle that can obtain the advantages of being small in size, lightweight and low in cost, without the need to provide a new activation means.

SUMMARY OF THE INVENTION

An electronic key system of the present invention has a controller mounted in the vehicle itself, and a portable transceiver carried by a user of the vehicle, the vehicle containing a locking unit for causing the vehicle to be locked so that the vehicle cannot be used until a lock release command is received. The controller comprises a a transmitter that outputs a request signal to the portable transceiver in response to ON operation of predetermined switches. The predetermined switches being previously identified from among a plurality of switches positioned in the vicinity of the user when the user boards the vehicle. The controller also comprises a receiver unit which receives an acknowledgement signal, in response to the request signal, from the portable transceiver, and a drive unit which outputs a lock release command to the locking unit when the acknowledgement signal is compared and judged to be a request from the user.

In this way, when the user boards the vehicle, communication to the portable transceiver is started by operation of any of the plurality of switches positioned close to the user. Accordingly, in a series of operations performed by the user when boarding the vehicle, operation of any of the plurality of switches can easily be performed by the user, and it is possible to smoothly carry out activation of the controller.

Further, since activation is performed by a user operating a predetermined switch (hereinafter referred to as the activation switch) from among the plurality of switches, it is not possible to easily discover the activation switch, even if another user (someone who is not the normal user) attempts to carry out the operation, and thus the invention also is effective for preventing theft.

An electronic key system for a vehicle of the present invention also has a controller mounted in the vehicle itself and a portable transmitter carried by a user of the vehicle. The vehicle contains a locking unit which causes the vehicle to be locked so that the vehicle cannot be used until a lock release command is received. The portable transmitter contains a transmitter unit that outputs a request signal to the controller in response to an operation input by the user. The controller comprises a receiver which receives a request signal from the portable transmitter in response to ON operation of predetermined switches, among a plurality of switches positioned in the vicinity of the user when the user boards the vehicle. The controller also includes a drive unit which outputs a lock release command to the locking unit when the acknowledgement signal is compared and judged to be a request from the user.

In this case also, it is possible to smoothly activate the controller during a series of operations performed by the user when boarding the vehicle, and it is possible to improve operability of activation using the electronic key, wherein the invention is also effective in preventing theft.

In the invention described above, if the vehicle is not started for a specified period of time, it is also possible to include an interrupting circuit which permits interruption of the supply of power to at least those circuits, inside the controller, that perform communication. An interrupting circuit controller is provided which permits supply of power to the circuits in response to ON operation of a predetermined switch (activation switch) among the plurality of switches positioned in the vicinity of the user when the user boards the vehicle.

In this way, when the vehicle has not been started for a specified period of time, thereafter, it is possible to significantly reduce power consumption during standby by stopping supply of electrical power to circuits relating to communication until the activation switch is operated.

Also, since as long as the specified activation switch is not operated, external communication (communication with the portable transceiver or receipt of a request signal from the portable transmitter) is not carried out, and moreover since it is not easy to discover the activation switch, the invention is effective for theft prevention.

If the vehicle is not started for a specific period of time, it is also possible for the invention described above to include a switching circuit which intermittently supplies power to at least those circuits, inside the controller, that perform communication. A switching circuit controller is provided which permits return from a mode in which power is supplied intermittently to a mode in which a normal supply of power is provided to the circuits. This return occurs in response to an ON operation of a predetermined switch, which has been previously selected from among a plurality of switches positioned in the vicinity of the user when the user boards the vehicle.

In this way, when the vehicle has not been started for a specified period of time, thereafter, it is possible to significantly reduce power consumption during standby by supply of electrical power intermittently to circuits relating to communication until the activation switch is operated.

It is also possible for the plurality of switches of the invention described above to be operational switches used for starting the vehicle engine, providing safety during travel, and stopping the vehicle. In this case, since it is not necessary to provide a new activation switch, it is possible to obtain the advantages of small size, lightness of weight, and reduction in cost.

It is also possible to include a switch for detecting that the user has boarded the vehicle (boarding detection switch) as one of the plurality of switches. When such a boarding detection switch has been switched on, a request signal is automatically output from a controller at the point in time that the user boards the vehicle, or alternatively, receipt of a request signal from a portable transmitter is started, whereby it is possible to significantly improve operability.

DETAILED DESCRIPTION OF THE INVENTION

Embodiments of the electronic key system of the present invention applied to, for example, a motorcycle system, will now be described with reference to FIGS. 1 through 11.

Figure 1:
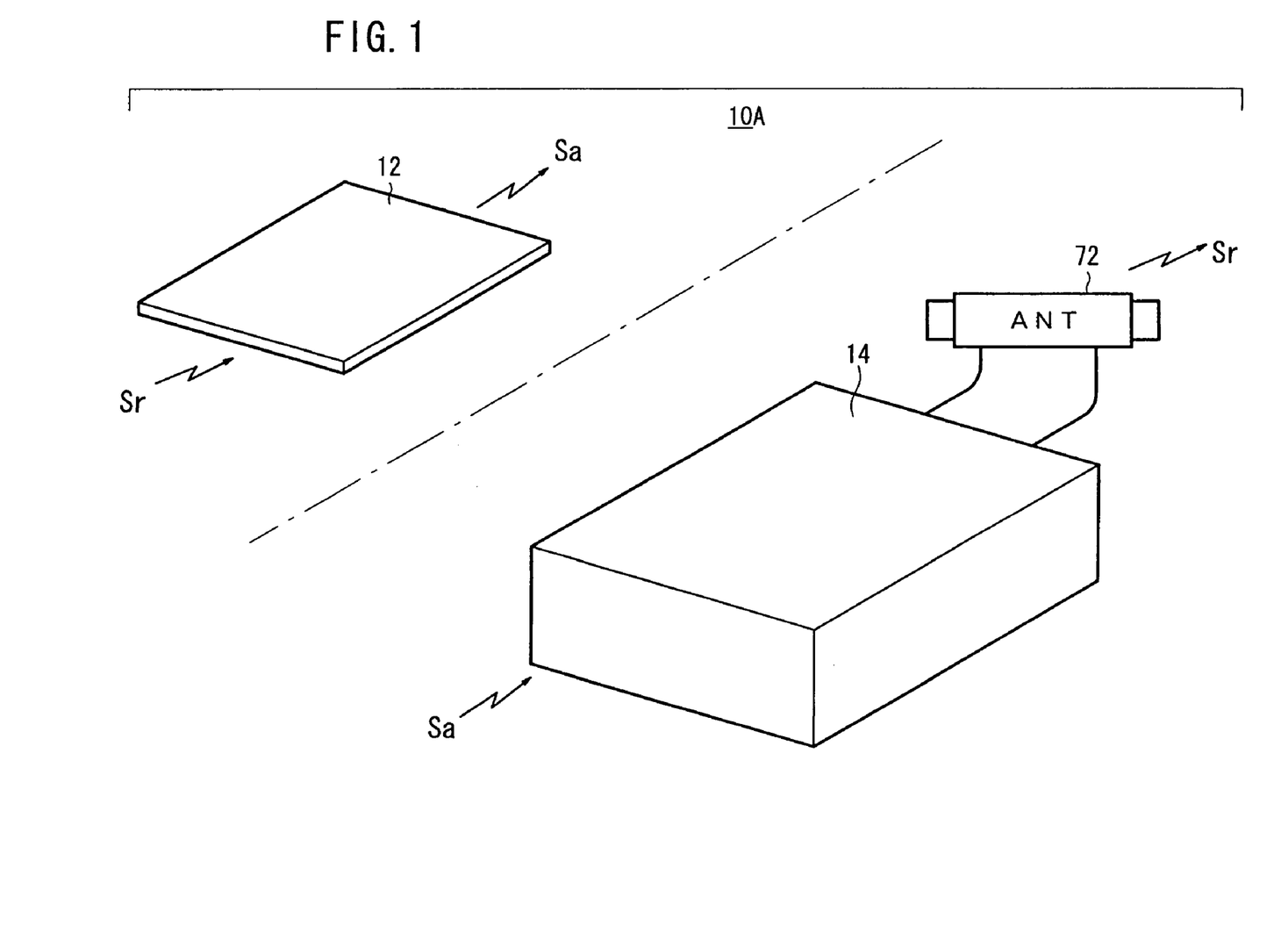
FIG. 1 is a structural drawing showing an electronic key system according to a first embodiment.

As shown in FIG. 1, an electronic key system 10A according to a first embodiment includes a portable transceiver 12 carried by a user, and a controller 14 mounted on the vehicle. The portable transceiver 12 either takes on the external appearance of a key with an IC chip built inside, or takes on the external appearance of a card with an IC chip built inside, but in the case where a keyless system is adopted, a card type is mainly used. With this embodiment, a description will be given assuming a portable transceiver 12 shaped like a card. Also, since the portable transceiver 12 is generally called an electronic key, the portable transceiver will also be referred to as an electronic key 12 in the following description.

The electronic key 12 is a card type, as described above, and as shown in FIG. 2, internally comprises a battery 20, a power supply circuit 22, a CPU 24, a receiving circuit 26 and a transmission circuit 28.

Figure 2:
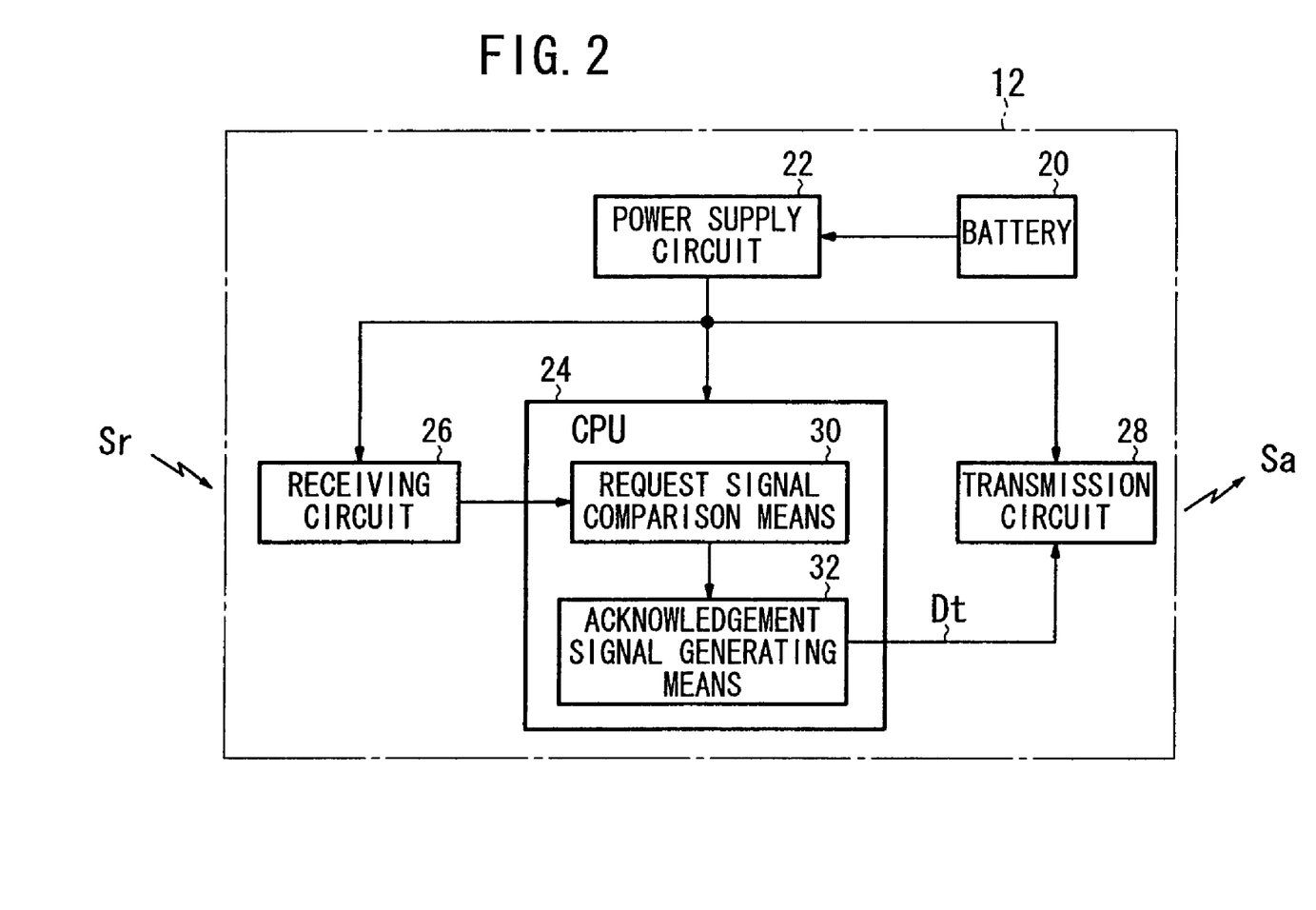
FIG. 2 is a block drawing showing the structure of an electronic key in the electronic key system of the first embodiment.

The power supply circuit 22 provides electrical power from the battery 20 to the receiving circuit 26, transmission circuit 28 and CPU 24. The receiving circuit 26 has a receiving antenna, not shown, and receives a request signal Sr or the like transmitted through the receiving antenna from the controller 14, and further extracts and demodulates the signal from a carrier wave. The demodulated signal is supplied to the CPU 24. The carrier wave frequency of the request signal Sr is 100 kHz to 300 kHz.

The CPU 24 executes at least the following two programs: (Request signal comparison means 30 and acknowledgement signal generating means 32). The request signal comparison means 30 compares whether or not a signal supplied from the receiving circuit 26 is the request signal Sr, and if it is the request signal Sr, transfers control to the acknowledgement signal generating means 32. The acknowledgement signal generating means 32 reads out ID data stored in a ROM, not shown, in response to a request from the request signal comparison means 30, adds an attribute representing acknowledgment to the ID data, and outputs this as transmission data Dt to the transmission circuit 28. The transmission circuit 28 has a transmission antenna, not shown, and performs modulation of a carrier wave based on transmission data Dt supplied from the CPU 24, and further transmits this as an acknowledgement signal Sa through the transmission antenna. The carrier frequency for the acknowledgement signal Sa is 200 MHz to 500 MHz.

Figure 3:
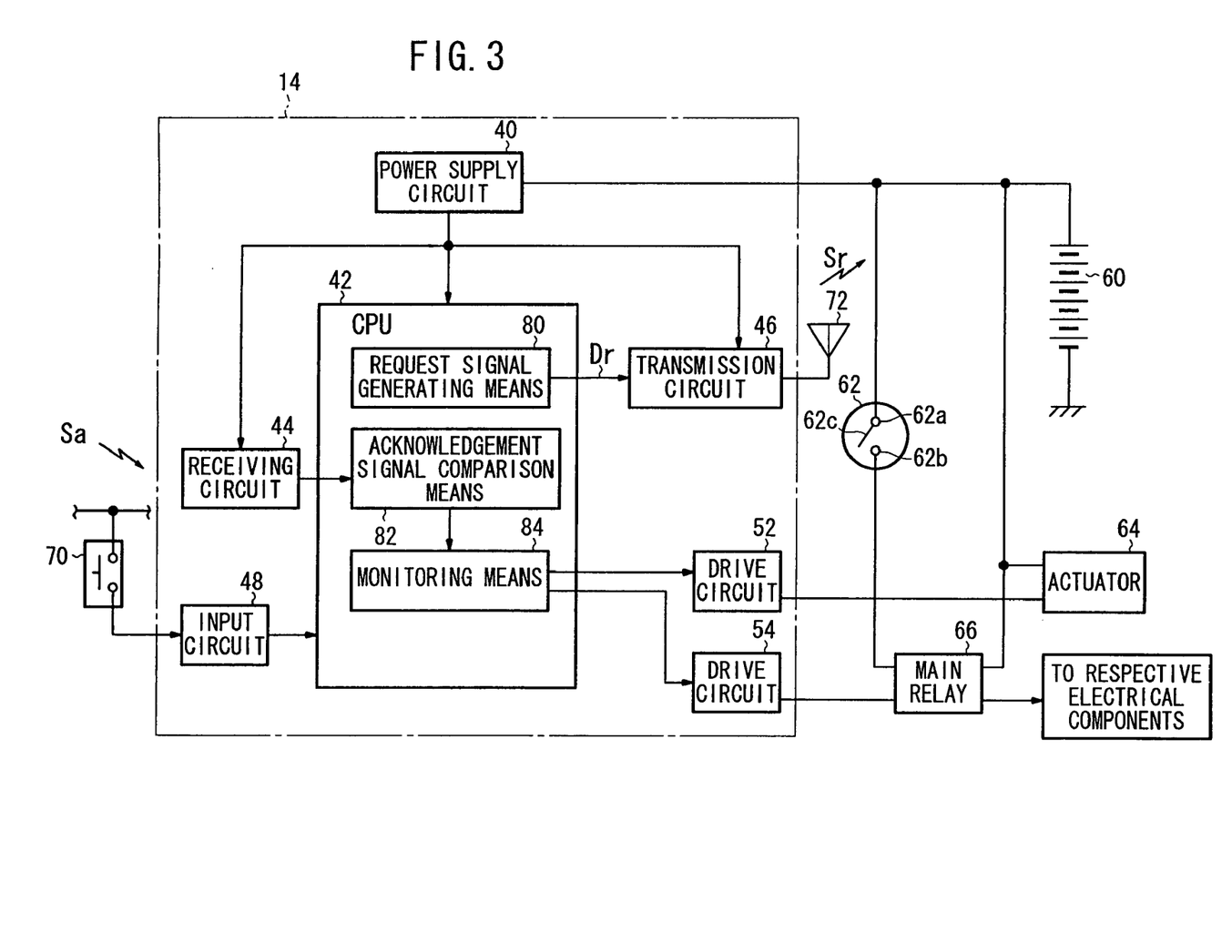
FIG. 3 is a block diagram showing the structure of a controller in the electronic key system of the first embodiment.

On the other hand, as shown in FIG. 3, the controller 14 mounted in the vehicle is constituted by a system LSI, for example, and comprises a power supply circuit 40, a CPU 42, a receiving circuit 44, a transmission circuit 46, an input circuit 48, a first drive circuit 52 (for actuator drive), and a second drive circuit 54 (for main relay drive). Peripheral to this controller 14, there are provided at least a battery 60, a main switch 62, a handlebar actuator 64, a main relay 66, an activation switch 70 and a transmission antenna 72.

The main switch 62 has two fixed connection points 62a and 62b, and one movable connection point 62c, with one fixed connection point 62a being connected to the battery 60, and the other fixed connection point 62b being connected to the main relay 66.

The activation switch 70 is connected to the input circuit 48, and the ON/OFF state of the activation switch 70 is supplied through the input circuit 48 to the CPU 42.

Figure 4:
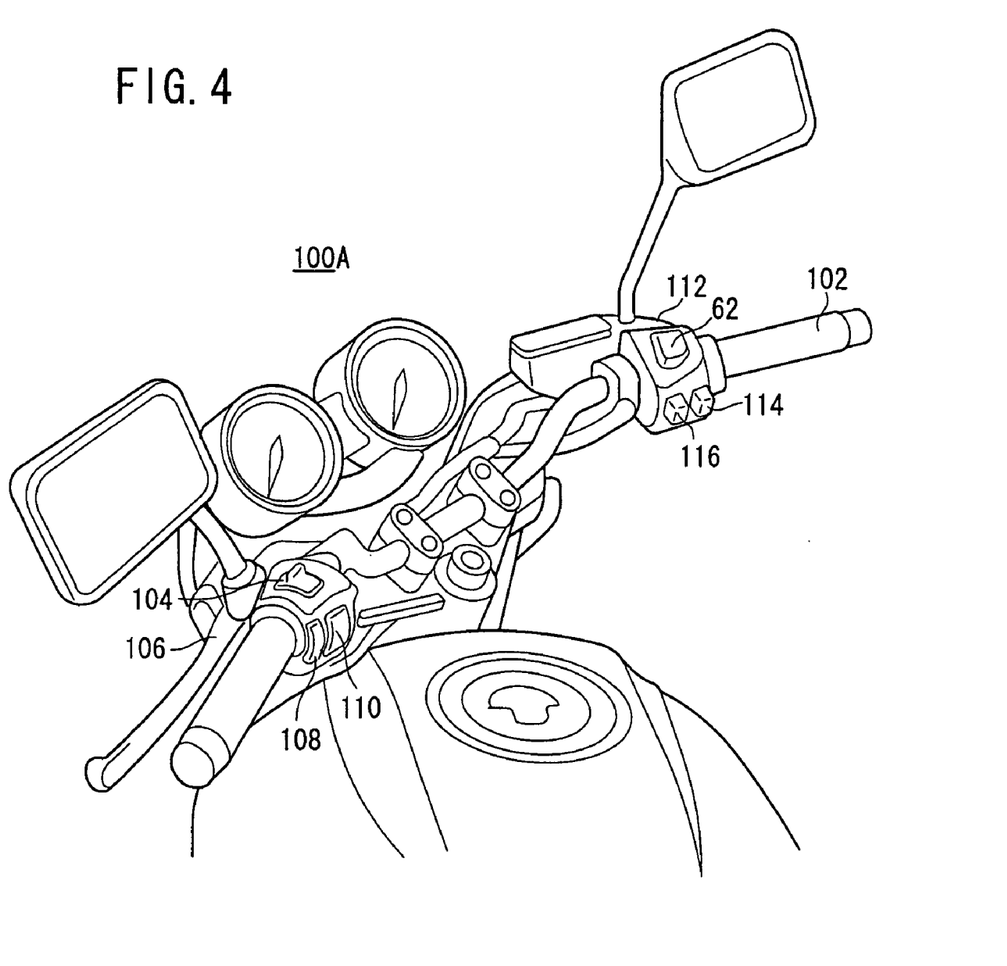
FIG. 4 is an explanatory drawing showing an example of operational switches (switches which are candidates for being the activation switch) disposed in the vicinity of handlebars of a motorcycle type vehicle.

As the activation switch 70, it is possible to set any operation switch used for, for example, starting the vehicle engine, providing safety during travel, and stopping the vehicle. Specifically, as shown in FIG. 4, in the case where the vehicle is a motorcycle type vehicle 100A, it is possible to set any of a lighting dimmer switch 104, a clutch switch 106, an indicator switch 108, a horn switch 110, a front brake switch 112, a hazard switch 114 or a starter switch 116, all of which are provided in the vicinity of the handlebar 102, as the activation switch 70.

Figure 5:
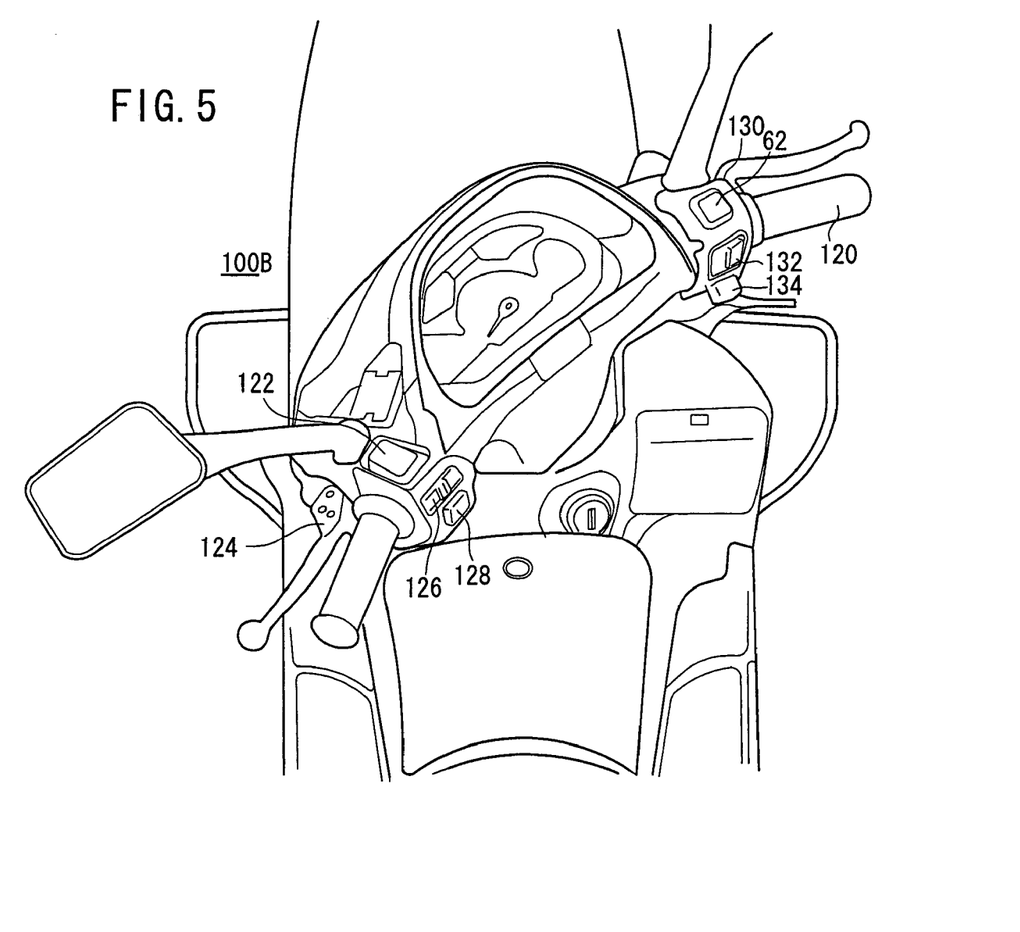
FIG. 5 is an explanatory drawing showing an example of operational switches (switches which are candidates for being the activation switch) disposed in the vicinity of handlebars of a scooter type vehicle.

Also, if the vehicle is a scooter type vehicle 100B, as shown in FIG. 5, it is possible to set any of a lighting dimmer switch 122, a rear brake switch 124, an indicator switch 126, a horn switch 128, a front brake switch 130, a hazard switch 132 or a starter switch 134, all of which are provided in the vicinity of the handlebar 120, as the activation switch 70.

Setting of the activation switch 70 is determined in advance by means of, for example, an agreement between the user and the dealer at the time the user purchases the motorcycle 100A or scooter 100B, and can be wired in at the factory based on the decided items. For example, wiring to connect the switch determined to be the activation switch 70 to the input circuit 48 of the controller 14 is carried out at the factory.

Figure 6:
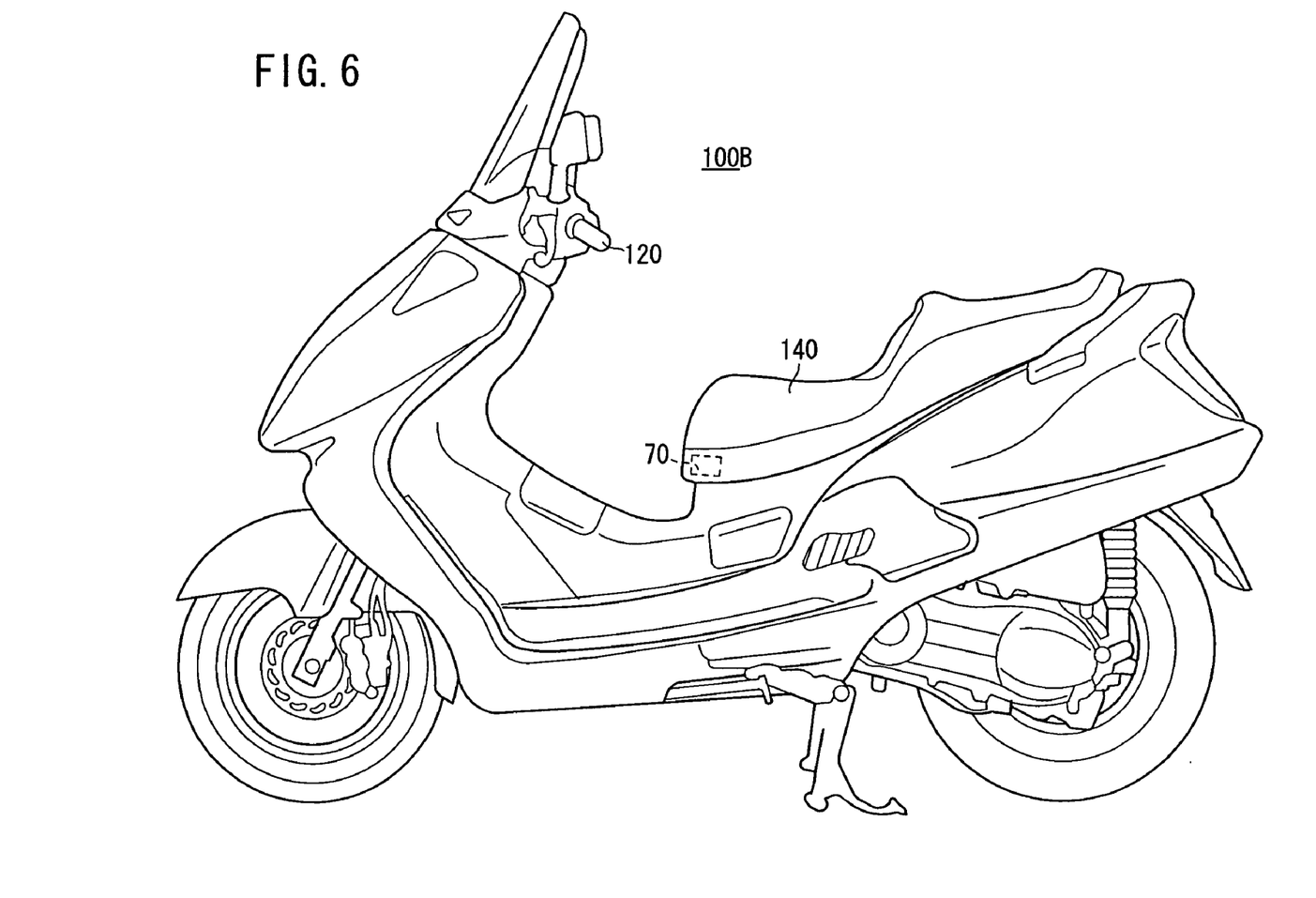
FIG. 6 is an explanatory drawing showing an example wherein the activation switch is arranged on a front section of a seat, in a scooter type vehicle.

While it is possible to have any of the various switches provided in the vicinity of the handlebars 102 and 120 as described above, serve as the activation switch 70, it is also possible, with the scooter 100B, for example, to provide the activation switch 70 particularly close to the seat 140, as shown in FIG. 6.

The scooter 100B has a space in which it is possible to stow a helmet, not shown, below the seat 140, and normally, when the scooter is not mounted, the helmet would be stowed in this space. Therefore, when the scooter 100B is mounted, since an operation to open and close the seat 140 to remove the helmet must be performed, it is possible to easily carry out an operation of the activation switch 70 together with taking out the helmet, by providing the activation switch 70 at a front part of the seat 140, as shown in FIG. 6.

On the other hand, the power supply circuit 40 for the controller 14 supplies electrical power from the battery 60 to the CPU 42, the receiving circuit 44, and the transmission circuit 46, etc.

The receiving circuit 44 has a receiving antenna, not shown, and an acknowledgement signal Sa is received from the electronic key through the receiving antenna, and further is extracted and demodulated from a carrier wave. The demodulated signal is supplied to the CPU 42.

The CPU 42 executes at least three programs (request signal generating means 80, acknowledgement signal comparison means 82 and monitoring means 84).

The request signal generating means 80 reads out request data Dr (data constituting the source of the request signal Sr) from a ROM, not shown, in response to the ON operation of the activation switch 70, and outputs the data to the transmission circuit 46.

The transmission circuit 46 modulates a carrier wave based on the request data Dr supplied from the CPU 42, for transmission via the transmission antenna 72 as the request signal Sr.

Figure 7A:
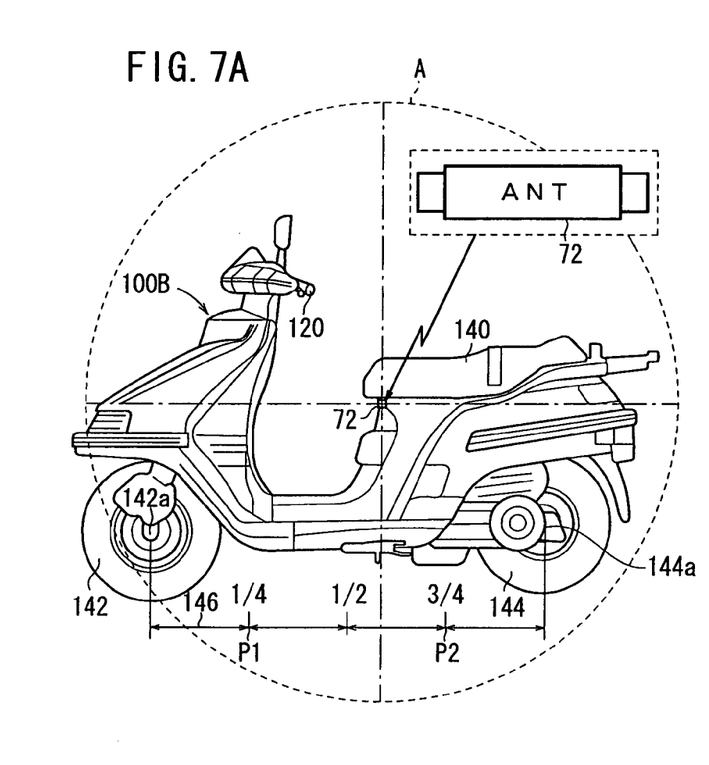
FIG. 7A is a side elevation showing one example of a setting position for a transmission antenna on the vehicle.
Figure 7B:
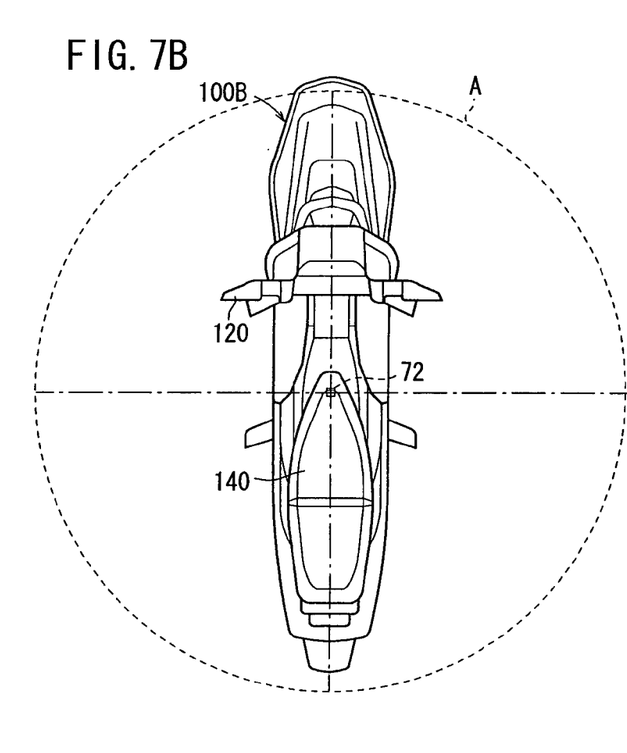
FIG. 7B is plan view of the same.

As shown in FIG. 7A and FIG. 7B, the transmittable range of the request signal Sr, assuming the vehicle is a scooter 100B, is a spherical range (the range shown by circle A in FIG. 7A and FIG. 7B) of a diameter of 1 to 1.5 m, with the transmission antenna fitted to the scooter 100B at the center, and is a narrow range compared to the transmittable range of the acknowledgement signal Sa (a range of a few m radius with the electronic key 12 as the center).

Thus, in order for reliable contact with the electronic key 12 carried by the user, when carrying out operations such as opening the seat 140 during boarding of the vehicle, as shown in FIG. 7A and FIG. 7B, it is preferable to arrange the transmission antenna 72 in the vicinity of the center of the scooter 100B.

Here, when considering a line 146 between the center 142a of the front wheel 142 and the center 144a of the rear wheel 144, the vicinity of the center of the scooter 100B is a range from a point P1, which is ¼ of the line 146, to a point P2, which is ¾ of the line 146, with the center 142a of the front wheel 142 serving as a reference, for example. These dimensions are the same for the motorcycle 100A. With this embodiment, the transmission antenna 72 is arranged close to the front of the seat 140.

The acknowledgement signal comparison means 82 compares whether or not a signal supplied from the receiving circuit 44 is an acknowledgement signal Sa, and if it is the acknowledgement signal Sa, the acknowledgement signal comparison means 82 compares whether or not ID data contained in the acknowledgement signal Sa matches ID data stored in a memory (not shown).

The monitoring means 84 monitors presence or absence of arrival of an acknowledgement signal Sa (whether not an ID match is detected by the acknowledgement signal comparison means 82) based on output of the request signal Sr. The request signal generating means 80 awaits input of the acknowledgement signal Sa from a point in time when the request data Dr is output, and if an acknowledgement signal Sa arrives within a specified time, a lock release signal is output to the first drive circuit 52, and an ON signal is output to the second drive circuit 54.

The first drive circuit 52 drives an actuator 64 for the handlebar in response to input of the lock release signal from the CPU 42, and releases a locked state of the handlebars 102 and 120.

The second drive circuit 54 is put into an ON state based on input of an ON signal from the CPU 42, and thereafter, starts the engine and enters a state in which travel is enabled, in a step where the main relay 66 is turned on by an ON operation of the main switch 62.

If the main switch 62 is turned OFF, the main relay 66 becomes OFF, and the engine is also stopped at the same time. If a locking operation is then carried out, for example, by putting the handlebar 102 in a locked state, the comparison operation for the acknowledgement signal Sa in the controller 14 is stopped, and the second drive circuit 54 is turned OFF.

Next, representative processing operations of the electronic key system 10A of the first embodiment will be described with reference to the timing charts shown in FIGS. 8A to 8E. A request signal Sr is a signal having a pulse string based on request data Dr, and the acknowledgement signal Sa is a signal having a pulse string based on data contained in the ID data, but in FIGS. 8A to 8E, the signals have each been shown as single pulse signals to simplify description.

Figure 8A:
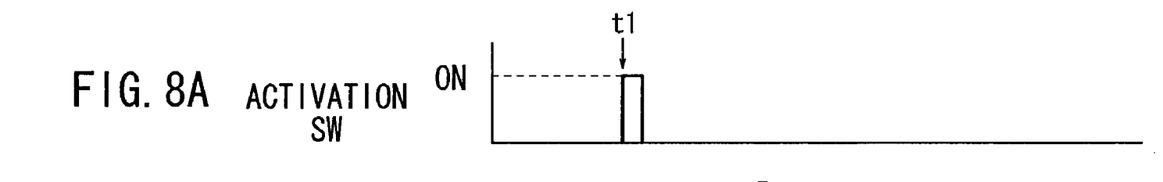
FIGS. 8A to 8E are timing charts showing an example of processing operations in the electronic key system of the first embodiment.
Figure 8B:
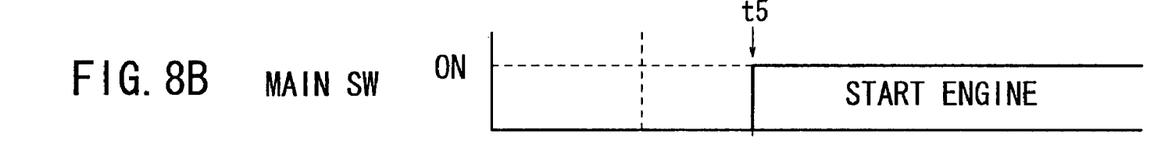
Figure 8C:
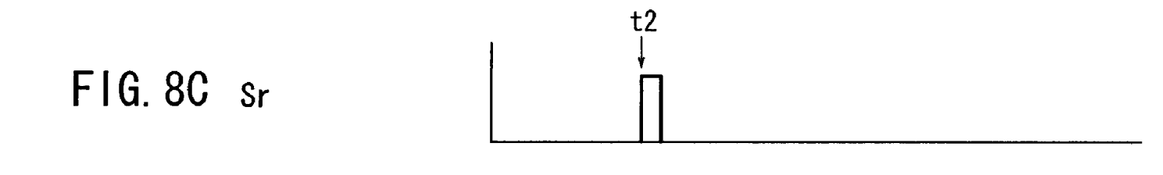

First of all, at time t1 in FIG. 8A, in a state where a user is in possession of the electronic key 12, if the activation switch 70 is turned ON, the request signal Sr is transmitted from the controller 14 (refer to time t2), as shown in FIG. 8C, and communication with the electronic key 12 commences.

Figure 8D:
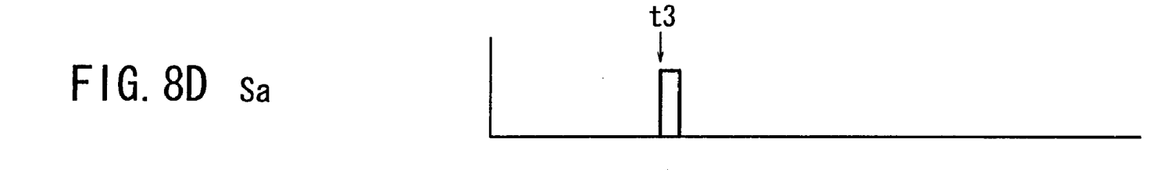
Figure 8E:
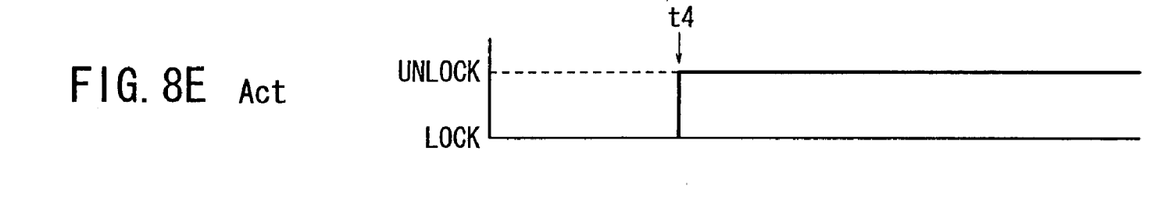

When the user is in possession of the electronic key 12, the request signal Sr is received by means of the receiving circuit 26 of the electronic key 12 (refer to FIG. 2). As shown in FIG. 8D, the electronic key 12 transmits an acknowledgement signal Sa in response to receipt of the request signal Sr (refer to time t3). The acknowledgement signal Sa is supplied through the receiving circuit 44 of the controller 14 to the CPU 42 (refer to FIG. 3), and ID data included in the acknowledgement signal Sa is compared. When it is judged that the ID data matches, the locked state of the handlebar 102 is released by means of the controller 14 and the first drive circuit 52, as shown in FIG. 8E (refer to time t4). At this time, the second drive circuit 54 is turned ON.

Continuing, if the main switch 62 is turned ON at time t5 in FIG. 8B, the engine is started and a state in which travel is enabled is entered.

In this way, in the electronic key system 10A according to the first embodiment, since among the various switches arranged in the vicinity of the handlebars 102 and 120, the user sets a predetermined switch as the activation switch 70, when the user boards the vehicle, the activation switch 70 is positioned close to the user. As a result, during a series of operations performed by the user when boarding the vehicle, operation of the activation switch 70 can be carried out simply by the user, and it is possible to smoothly activate the controller 14.

Also, since the activation switch 70 is a predetermined switch from among the various switches that are arranged in the vicinity of the handlebars 102 and 120, which is set by the user at the time of making an agreement with a dealer, for example, it is not easy for another user (who is not the normal user) to easily locate the activation switch 70, and thus the invention is effective in preventing theft.

In particular, in the case that one of the operational switches used in starting the vehicle engine, providing safety during travel, or stopping the vehicle, is set as the activation switch 70, since it is not necessary to provide a new activation switch 70, it is possible to obtain the advantages of miniaturization, lightness of weight, and low cost.

Also, if the activation switch 70 is attached to a front section of the seat 140, it is possible to operate the activation switch 70 at the same time as taking out a helmet, and it is therefore possible to significantly improve operability.

Among the switches arranged on the vehicle, at least the switch that is set as the activation switch 70 can be a mechanical contact type switch, but as for the other switches, it is possible to use electrostatic touch switches, switches that use the principles of piezoelectric elements, or switches that take advantage of hall elements, etc.

Next, an electronic key system 10B according to a second embodiment will be described with reference to FIGS. 9 and 10. Members and means corresponding to those in FIGS. 2 and 3 have the same reference numerals attached thereto, and repeated description of those sections will be omitted.

Figure 9:
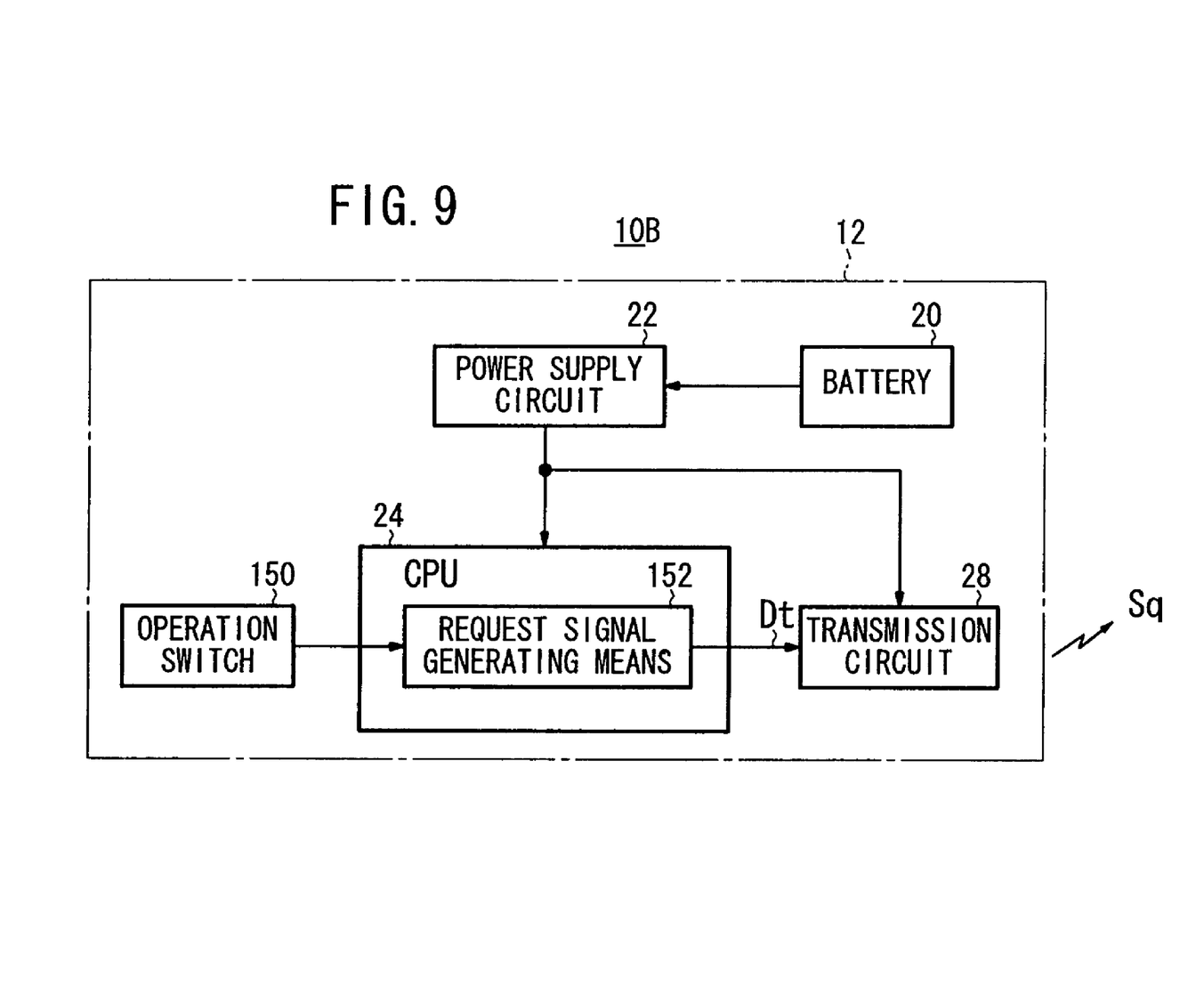
FIG. 9 is a block drawing showing the structure of an electronic key in an electronic key system according to a second embodiment.

As shown in FIG. 9, the electronic key 12 of the electronic key system 10B according to the second embodiment has almost the same structure as the electronic key 12 of the first embodiment (refer to FIG. 2), but is different in that it has an operation switch 150.

Further, the CPU 24 executes at least one program (request signal generating means 152). The request signal generating means 152 is activated by an ON operation of the operation switch 150, and reads out ID data stored in a ROM, not shown, and further adds an attribute representing acknowledgment to the ID data for output to the transmission circuit 28 as transmission data Dt. The transmission circuit 28 has a transmission antenna, not shown, and modulates a carrier wave based on the transmission data Dt supplied from the CPU 24, to transmit the data as a request signal Sq by means of the transmission antenna. The carrier frequency of the request signal Sq is 200 MHz to 500 MHz.

Figure 10:
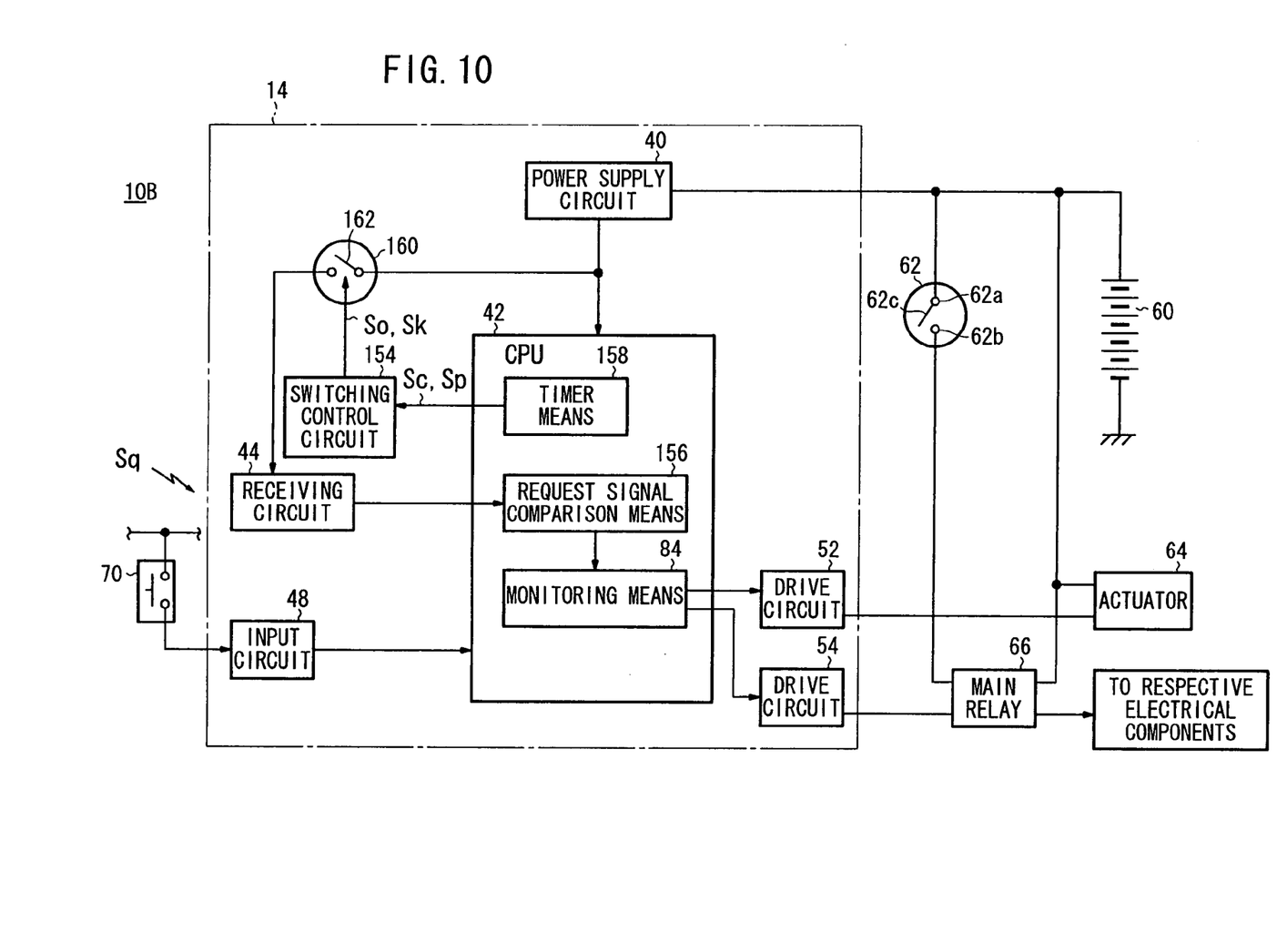
FIG. 10 is a block diagram showing the structure of a controller in the electronic key system of the second embodiment.

On the other hand, as shown in FIG. 10, the controller 14 mounted on the vehicle has almost the same structure as the controller 14 of the first embodiment described above (refer to FIG. 3), but is different in that there is no transmission circuit 46 or transmission antenna 72. The controller 14 includes a switching circuit 160 for selectively stopping supply of electrical power to the receiving circuit 44, and further includes a switching control circuit 154 for ON/OFF control of the switching circuit 160, by outputting an ON signal So and an intermittent pulse signal Sk to the switching circuit 160.

The receiving circuit 44 has a receiving antenna, not shown, and receives a request signal Sq that has been transmitted from the electronic key 12 by means of the receiving antenna, and further extracts and demodulates the signal from a carrier wave. The demodulated signal is supplied to the CPU 42.

The CPU 42 executes at least the following three programs: (Request signal comparison means 156, monitoring means 84, and timer means 158).

The request signal comparison means 156 compares whether or not the signal supplied from the receiving circuit 44 is a request signal Sq, and, if it is a request signal Sq, compares whether or not ID data contained in the request signal Sq matches ID data stored in a memory, not shown.

The monitoring means 84 monitors presence or absence of the request signal Sq arriving (whether or not an ID match is detected by the request signal comparison means 156), and in the event that a request signal Sq from the electronic key 12 carried by the normal user is detected, the monitoring means 84 outputs a lock release signal to the first drive circuit 52, releasing the locked state of the handlebars 102, 120, and puts the second drive circuit 54 in an ON state. After that, the engine is started and a state in which travel is possible is enabled, at a stage of turning the main relay 66ON by operating the main switch 62.

If the main switch 62 is turned OFF, the main relay 66 is turned OFF and at the same time the engine is stopped. At this time, the second drive circuit 54 is turned OFF.

The timer means 158 outputs a continuation instruction signal Sc to the switching control circuit 154 at the time that the activation switch 70 is turned ON and during a period when the main switch 62 is ON, as well as during a period from when the main switch 62 is turned OFF until a specified value is counted by the timer means 158.

Also, the timer means 158 counts reference counts from a clock generator, not shown, from a point in time when the main switch 62 is turned OFF. When counting to a specified value has been completed (for example, after two days or a week have elapsed), the timer means 158 outputs an intermittent command signal Sp to the switching control circuit 154.

The switching control circuit 154 outputs an ON signal So to the switching circuit 160 during the period when the continuation instruction signal Sc is being supplied from the timer means 158. The switching circuit 160 turns the switch 162ON in response to the supplied ON signal So, and in this way supply of electrical power to the receiving circuit 44 continues normally.

At a point in time when the intermittent instruction signal Sp is supplied from the timer means 158, the switching control circuit 154 generates an intermittent pulse signal Sk for intermittently switching an attribute ON and OFF and outputs it to the switching circuit 160. The switching circuit 160 intermittently repeats the ON operation and OFF operation based on the supplied intermittent pulse signal Sk. Electrical power supply to the receiving circuit 44 becomes intermittent, and the controller 14 is transferred to a power saving operating mode.

Then, if the activation switch 70 is turned on while in the power save operation mode, the continuation instruction signal Sc is output from the timer means 158 to the switching control circuit 154, and in this way electrical power supply to the receiving circuit 44 continues normally.

In the electronic key system according to the second embodiment, if the vehicle has not been started for a specified time period, since electrical power is supplied to the receiving circuit 44 intermittently thereafter and until the activation switch 70 is turned ON, it is possible to reduce power consumption when in standby.

Figure 11:
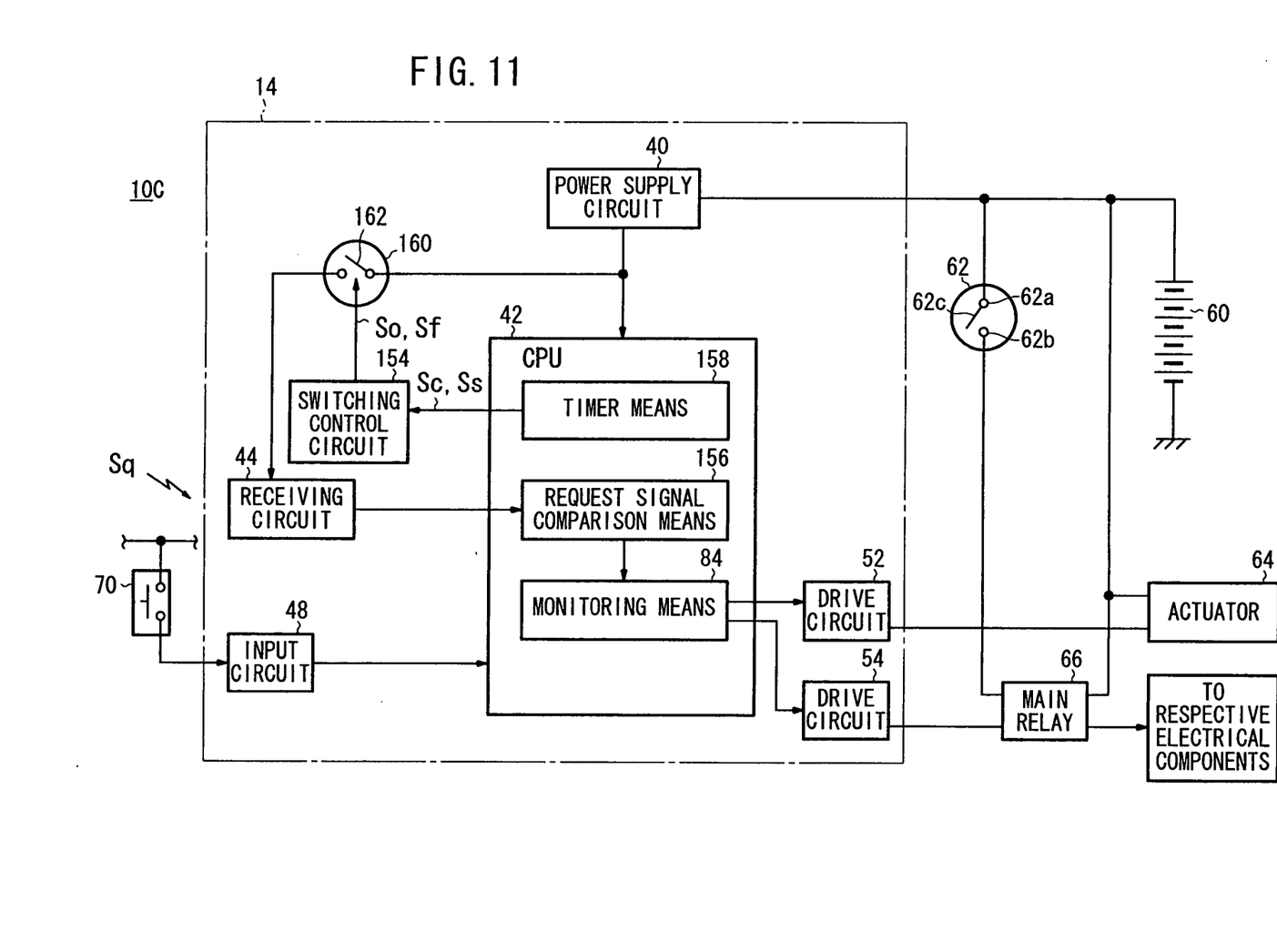
FIG. 11 is a block diagram showing the structure of a controller in an electronic key system according to a third embodiment.

Next, an electronic key system 10C according to a third embodiment will now be described with reference to FIG. 11. Members and means corresponding to those in FIG. 10 have the same reference numerals attached thereto, and repeated description of those sections will be omitted.

The electronic key 12 used in the electronic key system 10C of the third embodiment is the same as the electronic key 12 of the second embodiment described above (refer to FIG. 9).

The controller 14 has almost the same structure as the controller 14 of the second embodiment described above (refer to FIG. 10), but is different in that an ON signal So and an OFF signal Sf are output from the switching control circuit 154.

Specifically, the timer means 158 outputs a continuation instruction signal Sc to the switching control circuit 154 during a period when the activation switch 70 is turned ON and the main switch 62 is ON, and during a period from when the main switch 62 is turned OFF until a specified value is counted by the timer means 158.

Also, the timer means 158 counts reference counts from a clock generator, not shown, from a point in time when the main switch 62 is turned OFF. When counting to a specified value has been completed, the timer means 158 outputs a stop instruction signal Ss to the switching control circuit 154.

The switching control circuit 154 outputs an ON signal So to the switching circuit 160 during the period when the continuation instruction signal Sc is being supplied from the timer means 158, and in this way supply of electrical power to the receiving circuit 44 continues normally.

At a point in time when the stop signal Ss is supplied from the timer means 158, the switching control circuit 154 outputs the OFF signal Sf. The switching circuit 160 turns OFF the switch 162 in response to the supplied OFF signal Sf, and in this way supply of electrical power to the receiving circuit 44 is stopped completely.

If the activation switch 70 is turned ON while electrical power to the receiving circuit 44 is stopped, a continuation instruction signal Sc is output from the timer means 158 to the switching control circuit 154, and in this way, supply of electrical power to the receiving circuit 44 continues normally.

In the electronic key system 10C according to the third embodiment, if the vehicle has not been started for a specified period of time, thereafter, supply of electrical power to the receiving circuit 44 is stopped completely until the activation switch 70 is turned ON, which makes it possible to significantly reduce power consumption when in standby.

Moreover, since communication is not carried out to external components (communication with the electronic key 12) while the specified activation switch 70 is not turned ON, and since it is not easy to locate the activation switch 70, the system is effective for theft prevention.

The electronic key system of the present invention is not limited to the embodiments described above, and various structures can be introduced without departing from the spirit and scope of the invention.

The invention claimed is:

1. An electronic key system for a vehicle comprising a controller mounted in the vehicle and a portable transmitter carried by a user of the vehicle,
   the vehicle containing a locking unit which locks the vehicle so that the vehicle cannot be used until a lock release command is received,
   the portable transmitter comprising a transmitter unit that outputs a request signal to the controller in response to an operation input by the user, and
   wherein the controller comprises:
   a receiving circuit that receives the request signal from the portable transmitter;
   a receiver which receives via the receiving circuit the request signal from the portable transmitter in response to an ON operation of a switch which detects that the user has boarded the vehicle;
   a drive unit which outputs a lock release command to the locking unit when the request signal is compared and judged to be a request from the user;
   an interrupting unit which interrupts, if the vehicle is not started for a specified period of time, a supply of power to the receiving circuit inside the controller;
   an interrupting unit controller which permits the interrupting unit to provide power to the receiving circuit in response to an ON operation of the switch;
   a switching unit configured to interrupt a supply of power to the transmitter unit and receiving circuit, and
   a switching unit controller which permits the switching unit to provide:
   a normal supply of power to the transmitter unit and the receiving circuit in response to the ON operation of the switch when the user boards the vehicle,
   a normal supply of power to the transmitter unit and the receiving circuit for a specified period of time if the vehicle is turned off, and
   no power to the transmitter unit and the receiving circuit for an indefinite period of time after the specified period of time has elapsed.

2. An electronic key system for a vehicle comprising a controller mounted in the vehicle and a portable transmitter carried by a user of the vehicle,
   the vehicle containing a locking unit which locks the vehicle so that the vehicle cannot be used until a lock release command is received,
   the portable transmitter comprising a transmitter unit that outputs a request signal to the controller in response to operation input by the user, and
   wherein the controller comprises:
   a receiving circuit that receives the request signal from the portable transmitter;
   a receiver which receives via the receiving circuit the request signal from the portable transmitter in response to an ON operation of a switch which detects that the user has boarded the vehicle;
   a drive unit which outputs a lock release command to the locking unit when the request signal is compared and judged to be a request from the user;

a switching unit which permits an intermittent supply of power to be provided to the receiving circuit inside the controller if the vehicle is not started for a predetermined period of time;

a switching unit controller which permits the switching unit to provide a normal supply of power to the receiving circuit in response to ON operation of the switch;

a switching unit configured to interrupt a supply of power to the transmitter unit and receiving circuit, and a switching unit controller which permits the switching unit to provide:

a normal supply of power to the transmitter unit and the receiving circuit in response to the ON operation of the switch when the user boards the vehicle, a normal supply of power to the transmitter unit and the receiving circuit for a specified period of time if the vehicle is turned off, and no power to the transmitter unit and the receiving circuit for an indefinite period of time after the specified period of time has elapsed.

* * * * *